United States Patent [19]

Franke et al.

[11] Patent Number: 4,752,041
[45] Date of Patent: Jun. 21, 1988

[54] ELECTRIC FOOD PROCESSING APPARATUS

[75] Inventors: Wolfgang Franke, Langen; Walter Hufnagl, Glashütten, both of Fed. Rep. of Germany

[73] Assignee: Braun Aktiengesellschaft, Kronberg, Fed. Rep. of Germany

[21] Appl. No.: 923,884

[22] Filed: Oct. 28, 1986

[30] Foreign Application Priority Data

Oct. 29, 1985 [DE] Fed. Rep. of Germany ....... 3538383

[51] Int. Cl.$^4$ .............................................. B02C 18/18
[52] U.S. Cl. .................................................. 241/282.1
[58] Field of Search ............ 241/282.1, 282.2, 199.12, 241/277, 37.5; 83/356.3

[56] References Cited

U.S. PATENT DOCUMENTS

| 4,143,824 | 3/1979 | Shiotani | 241/282.1 |
| 4,173,310 | 11/1979 | Schaeffer | 241/282.1 |
| 4,200,244 | 4/1980 | Sontheimer | 241/282.1 |
| 4,331,300 | 5/1982 | Hicks et al. | 241/282.1 |

FOREIGN PATENT DOCUMENTS

| 1734427 | 11/1956 | Fed. Rep. of Germany . |
| 1746271 | 6/1957 | Fed. Rep. of Germany . |
| 1146628 | 4/1963 | Fed. Rep. of Germany . |
| 3020900 | 12/1982 | Fed. Rep. of Germany . |
| 2565883 | 12/1985 | France . |

Primary Examiner—Frank T. Yost
Assistant Examiner—Hien H. Phan

[57] ABSTRACT

The invention is directed to an electric food processing apparatus including a working vessel 1 and a cutting and blending tool 3 which is adapted to rotate therein near the vessel bottom and is provided with a central hub 4 adapted to be coupled to a drive shaft and connecting two blades 10, 11 positioned in different planes of rotation. The curved leading edges of the blades 10, 11 form the cutting edges 14, 15. The cutting edges 14, 15 of the blades 10, 11 are of different curvatures.

10 Claims, 1 Drawing Sheet

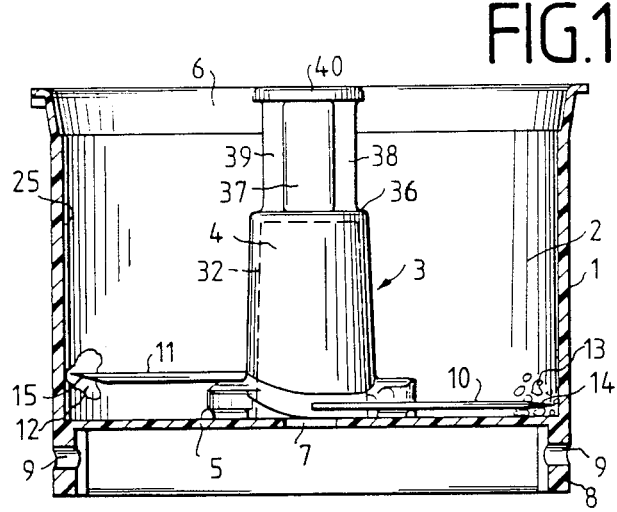
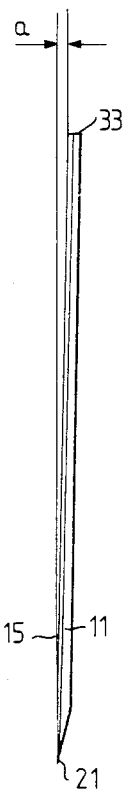
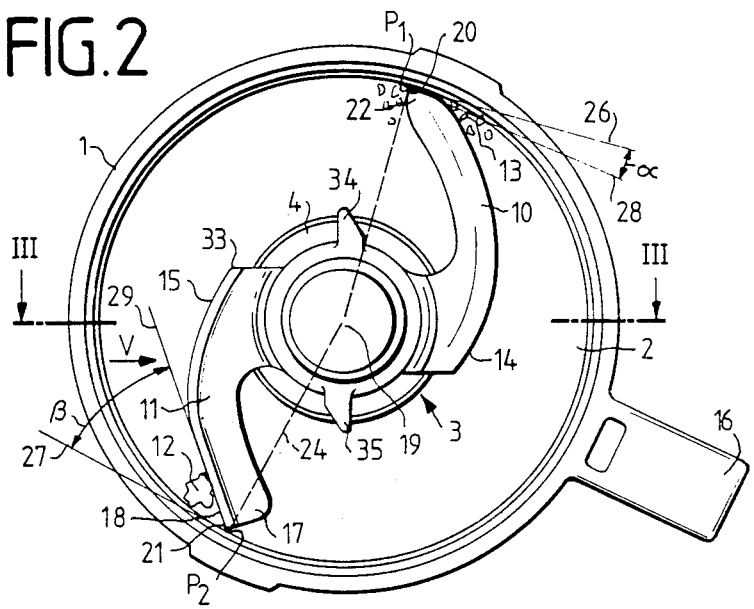
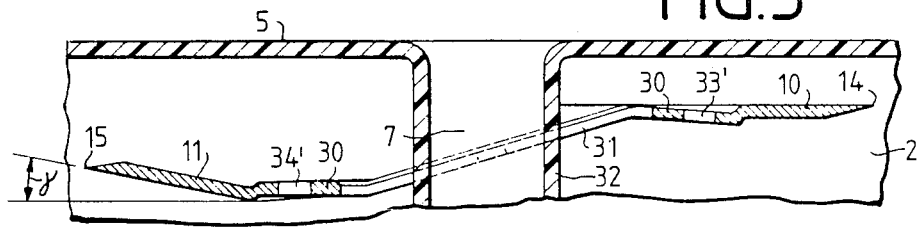

ELECTRIC FOOD PROCESSING APPARATUS

This invention relates to an electric food processing apparatus including a working vessel and a cutting and blending tool which is adapted to rotate therein near the vessel bottom and is provided with a central hub adapted to be coupled to a drive shaft and at least two, particularly crescent-shaped, blades secured to the hub in different planes of rotation, with the curved leading edges of the blades forming the cutting edges.

A food processing apparatus of the aforementioned type is known from German Pat. No. DE-C-3,020,900. In this specification, the cutter blades mounted in a removable cutter tool are of bent configuration in their plane of rotation in opposition to the direction of rotation to increase the area of cut, with the cutting edges forming, in the region of the inner wall of the vessel, an acute angle with the tangent to the wall. In this arrangement, a relatively small angle is particularly advantageous for cutting soft food materials such as parsley, onions, garlic, etc., but not so for chopping more solid foods such as nuts, carrots, etc., because of the risk of food particles becoming easily jammed between the blades and the container wall.

The food processing apparatus represented in U.S. Pat. No. 4,200,244 discloses a removable cutter tool having cutter blades of uniform cutting geometry in which the cutter blades are vertically spaced in different planes. This arrangement was selected because it was realized that the conventional practice of positioning the blades too close to the bottom in the same plane causes more solid food materials having their center of gravity above the plane formed by the cutter blades to be simply pushed upwards so that they remain unchopped, whereas a cutting plane arranged at too high an elevation adversely affects the fineness of the cutting action.

It is, therefore, an object of this invention to provide a removable cutter tool which is equally well suited for cutting both solid and soft materials to a sufficient degree of fineness without the material being cut becoming jammed between the blades and the working vessel.

According to the present invention, this object is accomplished by providing the tool with blades having cutting edges of different curvatures. Thus, in accordance with the invention, a removable rotary cutter tool for a food processing apparatus has at least two blades arranged in different planes, with the cutting geometry of the two blades being of different configuration, such that more solid food and large chunks of food are cut essentially by the upper cutter blade or blades while soft materials and/or the solid material already preprocessed are cut by the lower blade to the desired consistency.

In order to process combinations of quite different foods (soft and solid foods combined) in a single operation which has heretofore been impossible, an improvement of the invention provides for the curvature to progressively increase from the upper blade to the lower blade closer to the bottom at least in the radially outer end regions of the cutting edges of the blades.

To achieve optimum processing results using both soft and solid food materials, in accordance with the invention the tangent applied to the cutting edge of the lower blade at the radially outer free end thereof forms an angle $\alpha$ of between 0° and 20° with the tangent applied to the inner wall of the working vessel and having its point of contact radially opposite the end of the cutting edge, whilst the tangent applied to the cutting edge of the upper blade at the radially outer free end thereof forms an angle $\beta$ of between 40° and 60° with the tangent applied to the inner wall of the working vessel and having its point of contact radially opposite the end of the cutting edge.

To minimize the risk of jamming of large pieces of food, in an improvement of the invention the radially outer region of the cutting edge of the upper blade is defined by a straight line.

In food processing apparatus described in the prior art, a persistent problem particularly with a very light blade assembly is that the food to be processed or especially heavy doughs tend to push the blade assembly upwards against the cover closing the working vessel, thereby entailing the risk of damaging the cover due to the action of friction. To eliminate this disadvantage, according to the invention the upper blade positioned farther away from the vessel bottom is inclined in a radial direction to the bottom of the working vessel at an angle $\gamma$, in such a manner that the outer region of the blade, measured vertically to the bottom, is spaced a smaller distance from the bottom than the radially inner region of the blade. By configuring the upper blade as disclosed in the invention, the blade assembly will at all times be maintained at the same distance to the bottom of the working vessel, even if heavy food material is being processed. In this arrangement, the lower blade revolves essentially parallel to the bottom of the working vessel. If the angle of attack of the upper blade relative to the bottom is in the range from approximately 5° to 10°, good values result, producing a sufficiently large component of thrust onto the upper blade in the direction of the bottom of the working vessel.

To ensure that the material to be processed is cut to a uniform consistency without large chunks of food remaining in the working vessel, an improvement of the invention provides for the upper blade to be inclined in the circumferential direction to the bottom of the working vessel, such that the free end of the upper blade, measured vertically to the bottom, is spaced a smaller distance from the bottom than its fixed end. If, when viewed in the circumferential direction of the upper blade, the difference between the vertical distances of the fixed and free end is approximately 2 millimeters, particularly uniform processing results will be obtained.

An embodiment of the invention will now be described in more detail, by way of example with reference to the accompanying drawings, in which:

FIG. 1 is a longitudinal sectional view of the working vessel including a side view of a cutting and blending tool;

FIG. 2 is a plan view of the cutting and blending tool and the working vessel of FIG. 1;

FIG. 3 is a partial and enlarged longitudinal sectional view of the cutting and blending tool, taken along the line III—III of FIG. 2 but not showing the central hub thereof; and FIG. 4 is an enlarged side view of the upper blade only, taken in the direction of the arrow V of FIG. 2.

To avoid repetitions, parts identical in construction have been assigned like reference numerals in the FIGS. 1 through 4.

Referring now to FIGS. 1 and 2, there is shown a working vessel 1 of a food processing apparatus having a cutting and blending tool 3 arranged concentrically in the vessel interior 2. The central hub 4 which is preferably made of plastic material extends from the bottom 5 of the working vessel 1 upwards when viewing the drawing, terminating approximately at the elevation of the opening 6 of the working vessel 1. The opening 6 is adapted to be closed by a cover not shown in the drawing, the cover allowing rotation of the cutting and blending tool 3 only when properly seated, the rotation being produced by an electrically energized motor drive unit, not shown in the drawing either, which is coupled to a drive shaft, not shown in the drawing, which extends through the vessel bottom 5 in a bore 7. The drive shaft is received in a blind-end hole, not shown either, extending into the central hub 4 where it is secured to the central hub 4 in a non-rotatable relationship thereto via an engaging means likewise not shown.

Adjoining the vessel bottom 5 in downward direction when viewing the drawing is an annular section 8 corresponding to the diameter of the working vessel 1 and serving to locate and secure the working vessel 1 on a food processor base, not shown in the drawing. The securing means on the working vessel 1 are formed by slots 9 which are engaged by projections, not shown in the drawing, as the working vessel 1 is placed on the base of the food processing apparatus, the projections cooperating with the slots 9 to provide a connection in bayonet fashion.

Slightly above the vessel bottom 5, two substantially diametrical and vertically spaced blades 10, 11 are secured into the central hub 4, preferably by being molded into the hub 4. The lower blade 10 is secured to the central hub 4 in a position relatively close to the bottom 5 of the working vessel 1, while the substantially diametrical blade 11 is mounted at a slightly higher elevation to impact on and cut correspondingly large pieces of food 12 above its center of gravity. By contrast, the lower blade 10 takes care of the final processing, producing small particles of food 13. The radially outer ends of the blades 10, 11 when viewed in the circumferential direction form the cutting edges 14, 15. To obtain particularly sharp cutting edges 14, 15, the ends of the blades 10, 11 have their upper and/or lower sides beveled.

In FIG. 2, a handle 16 extends from the working vessel 1 radially outwardly for improved manipulation of the working vessel 1.

FIGS. 2, 3 and 4 reflect the cutting geometry of the blades 10, 11 for clarification. As becomes apparent from FIG. 2, the lower blade 10 is curved along the entire length of its cutting edge 14 whilst the cutting edge 15 of the upper blade 11 follows the course of a straight line 18 towards the free end 17. Starting from the free end 17, the straight-line course of the cutting edge 15 of the upper blade 11 covers approximately one third of the overall length of the cutting edge.

By connecting the radially outer corners 20, 21 forming the tips of the cutting edges 14, 15 at the free ends 22, 17 of the blades 10, 11 with the center 19 of the cutting and blending tool 3, the straight lines 23, 24 shown in broken lines in FIG. 2 are obtained which in their extensions radially beyond the blades 10, 11 intersect the inner wall 25 of the working vessel 1. The resulting points of intersection are identified by P1 and P2. By applying tangents 26, 27 to the inner wall 25 in the points of intersection P1, P2, these form, in combination with tangents 28, 29 applied to the cutting edges 14, 15 in the corners 20, 21, an angle $\alpha$ and $\beta$, respectively. Particularly good cutting results are produced if the angle $\alpha$ is approximately 15° and the angle $\beta$ is approximately 45°.

For the sake of simplicity, FIG. 3 shows only the two blades 10, 11 interconnected via an annular sheet metal member 30. The sheet metal member 30 includes a central bore 31 through which an annular neck 32 extends in downward direction when viewing the drawing. The neck 32 is formed at the bottom 5 of the working vessel 5. The neck 32 receives a drive shaft of the food processing apparatus, the shaft, which is not shown, extending in downward direction when viewing the drawing.

Extending radially outside the neck 32 is the central hub 4 of FIG. 1 which is molded to the sheet-metal member and has its radially outer wall extend through the bores 33', 34' formed in the sheet-metal member 30.

In FIG. 3, there extends from the central hub 4 upwardly into the neck 32 a tubular section, likewise not shown in the drawing, for engagement by the drive shaft. An engaging means, for example, a hexagon, is provided as a driving connection between the drive shaft and the tubular section.

While in FIG. 3 the blade 10 extends substantially parallel to the bottom 5, the blade 11 is inclined relative to the bottom 5. The resulting angle $\gamma$ is in the range from approximately 5° to 10°. Preferably, however, this angle $\gamma$ is in the range from 7° to 9°.

In FIG. 4, the distance a between the corner 21 and the corner 33 at the opposite end of the upper blade 11 is 2 millimeters, approximately.

The projections 34, 35 formed on the central hub 4 in FIGS. 1 and 2 serve to improve the circulation of the material being cut or blended.

In FIG. 1, the central hub 4 extends substantially conically in upward direction. Via an annular step 36, the central hub 4 continues in a reduced-diameter section in upward direction when viewing the drawing. The stem 37 thus formed is provided with diametrically opposite ribs 38, 39 having their upper ends bounded by a circular washer 40. The stem 37, the ribs 38, 39 and the washer 40 serve for improved handling of the cutting and blending tool 3 and for kneading doughs.

We claim:

1. Electric food processing apparatus comprising working vessel structure that has annular inner wall surface structure, bottom surface structure and drive shaft structure extending upwardly of said bottom surface structure, and a cutting and blending tool adapted to be disposed in said working vessel structure and releasably coupled to said drive shaft structure for driving in rotation, said cutting and blending tool including a central hub adapted to be disposed in said working vessel structure and releasably coupled to said drive shaft structure for driving in rotation, a first blade fixed to said hub and extending generally radially outwardly therefrom, a second blade fixed to said hub on the side opposite said first blade and extending generally radially outwardly therefrom, each said blade having a leading edge on which a cutting edge is formed, said first blade being adapted to rotate in a first plane of rotation when said hub is coupled to said drive shaft structure, and having a tip portion disposed closely adjacent said inner wall of said vessel, and said second blade being adapted to rotate in a second plane of rotation closer to said bottom surface structure than said first plane of rotation when said hub is coupled to said drive shaft structure, and having a tip portion disposed closely adjacent said inner wall of said vessel, the tip portion of said first blade forming an angle with said inner wall of said vessel that is greater than the angle formed by the tip portion of said second blade with said inner wall, and said first blade being inclined to the bottom surface of said working vessel such that a portion of its cutting edge is closer to said bottom surface structure than an adjacent body portion of said first blade.

2. Electric food processing apparatus as claimed in claim 1 wherein the curvature of the cutting edge of said second blade in its radially outer end region adjacent its tip portion progressively increases and is greater than the curvature of said first blade in its radially outer end region adjacent its tip portion.

3. Electric food processing apparatus as claimed in claim 1 wherein said tip portion of said first blade is generally radially opposite said tip portion of said second blade, the tangent of the cutting edge of said second blade at its radially outer end adjacent its said tip portion forms an angle $\alpha$ with the adjacent tangent of said inner wall surface structure of said working vessel of between 0° and 20°, and the tangent of the cutting edge of said first blade at its radially outer end forms an angle $\beta$ with the adjacent tangent of said inner wall surface structure of said working vessel of between 40° and 60°.

4. Electric food processing apparatus as claimed in any one of claims 1–3 wherein the radially outer end region of the cutting edge of said first blade is a straight line.

5. Electric food processing apparatus as claimed in any one of claims 1–3 wherein said first blade is inclined in a radial direction to said bottom surface structure of said working vessel such that a cutting edge portion of said first blade is closer to said bottom surface of said working vessel than the radially inner region of said first blade when said cutting and blending tool is coupled to said drive shaft structure for driving in rotation.

6. Electric food processing apparatus as claimed in any one of claims 1–3 wherein said first blade is inclined in a circumferential direction to said bottom surface structure of said working vessel such that the tip portion of said first blade is closer to said bottom surface of said vessel than the end of said first blade fixed to said hub when said cutting and blending tool is coupled to said drive shaft structure for driving in rotation.

7. Electric food processing apparatus as claimed in claim 1 wherein the radially outer end region of the cutting edge of said first blade is a straight line, the curvature of the cutting edge of said second blade in its radially outer end region adjacent its tip portion progressively increases and is greater than the curvature of said first blade in its radially outer end region adjacent its tip portion, and said first blade is inclined in a radial direction to said bottom surface structure of said working vessel such that a cutting edge portion of said first blade is closer to said bottom surface of said working vessel than the radially inner region of said first blade when said cutting and blending tool is coupled to said drive shaft structure for driving in rotation.

8. Electric food processing apparatus as claimed in claim 7 wherein said first blade is inclined in a circumferential direction to said bottom surface structure of said working vessel such that the tip portion of said first blade is closer to said bottom surface of said vessel than the end of said first blade fixed to said hub when said cutting and blending tool is coupled to said drive shaft structure for driving in rotation.

9. Electric food processing apparatus as claimed in claim 8 wherein the tangent of the cutting edge of said first blade at its radially outer end forms an angle $\beta$ with the adjacent tangent of said inner wall surface structure of said working vessel of between 40° and 60°, and the tangent of the cutting edge of said second blade at its radially outer end adjacent its said tip portion forms an angle $\alpha$ with the adjacent tangent of said inner wall surface structure of said working vessel of between 0° and 20°.

10. Electric food processing apparatus as claimed in claim 9 wherein the length of said straight line portion of the cutting edge of said first blade is about one-third of the entire length of the cutting edge of said first blade.

* * * * *